July 30, 1957     R. SCHNEIDER     2,800,886
SEPARATORS FOR EVAPORATORS
Filed April 8, 1953
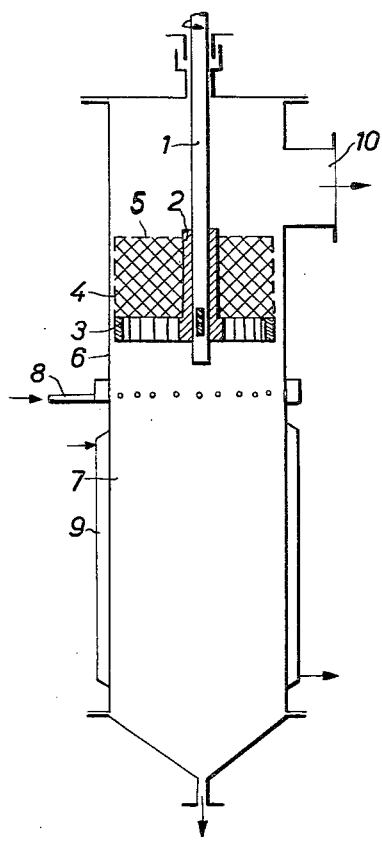
INVENTOR.
RUDOLF SCHNEIDER
BY
ATTORNEYS United States Patent Office 2,800,886
Patented July 30, 1957

2,800,886

SEPARATORS FOR EVAPORATORS

Rudolf Schneider, Krefeld-Uerdingen, Germany, assignor to Farbenfabriken Bayer Aktiengesellschaft, Leverkusen, Germany, a corporation of Germany Application April 8, 1953, Serial No. 347,482

Claims priority, application Germany April 10, 1952

2 Claims. (Cl. 122—34)

The present invention relates to an apparatus for separating liquid drops dragged along in evaporators.

In evaporators, especially those in which a thin layer of liquid flows down the inside wall of a vertical cylinder and evaporates on the cylindrical surface designed so as to form a heating surface, drops of liquid are frequently dragged along by the vapors and contaminate the distillate.

It is known to separate the liquid drops by means of an inserted bottom consisting of baffles, or by means of Raschig rings lying on a grate. These arrangements, however, have the disadvantage that the drops fall down at the collecting points, i. e. across the total sectional area, and drop on the bottom of the evaporator where they mix with the residue freed from the low boiling constituents.

It is an object of the present invention to provide an apparatus in which the above disadvantage is eliminated and the vapors are completely purified.

Further objects will become apparent as the following description proceeds.

The objects of the invention are accomplished by an apparatus for separating entrained liquid drops in evaporators, especially evaporators in which a thin layer of liquid flows down the inside wall of a vertical cylinder and evaporates on the cylindrical surface designed to form a heating surface, which apparatus comprises a basket containing filling material, which serves as a filter, the said basket being arranged in a discharge pipe and rotating upon its own shaft. By this arrangement, the intercepted drops are flung outwards and are deposited on the wall where they flow down in a thin layer and are returned to the heating surface.

The invention is illustrated by way of example in the accompanying diagrammatic drawing. As shown in the drawing, the apparatus provided by the invention comprises a vertical shaft 1 on which is mounted a hub 2 carrying a grate 3. The grate 3 carries a cylinder 4 which is made of perforated sheet metal or sieve netting so as to form a basket for containing filling material. The basket is closed by a cover 5 forming a grate or sieve plate. The basket 4 rotates at a small distance inside a cylindrical discharge pipe 6. The liquid separated inside the basket passes through the perforated wall of the cylinder 4 to the wall of the discharge pipe 6 where it flows down and is returned to an evaporator 7 arranged below the discharge pipe. The liquid to be evaporated is fed through a pipe 8 and flows, in a thin layer, down the inside wall of the evaporator 7, which evaporator is surrounded by a heating jacket 9. The vapors freed from liquid drops escape through an outlet 10.

The arrangement hereinbefore described, can, of course, be installed in any vapor outlet pipe in which it is of importance to liberate the vapors from entrained liquid drops. In this case, the pipe may also be horizontally arranged. The arrangement is especially suitable for evaporators in which a thin layer of liquid flows down the inside wall of a vertical, cylindrical heating surface and is distributed by wipers or brushes.

I claim:

1. In a film evaporator having a substantially cylindrical portion for the co-axial flow of vapor therethrough for discharge from the evaporator, the improvement which comprises a rotatable shaft axially positioned in said cylindrical portion, means containing filling material connected for rotation with said shaft positioned closely adjacent the walls of said cylindrical portion and having fluid-permeable walls to allow the flow of vapor therethrough in a direction co-axial to its axis of rotation and the flow of liquid therethrough in a direction substantially normal to its axis of rotation, means for rotating said shaft, and means for passing vapor through said means containing filling material in a direction co-axial to its axis of rotation, whereby drops of liquid carried along with the discharging vapors are entrapped by said filling material and centrifugally impelled onto the adjacent wall surface.

2. Improvement according to claim 1, in which said means containing filling material is a substantially cylindrical basket having fluid-permeable walls.

References Cited in the file of this patent

UNITED STATES PATENTS

| 1,580,380 | MacDonald | Apr. 13, 1926 |
| 2,561,394 | Marshall | July 24, 1951 |
| 2,596,086 | Muller | May 6, 1952 |

FOREIGN PATENTS

| 281,743 | Switzerland | July 1, 1952 |